US008685276B2

(12) United States Patent
Aboutanos et al.

(10) Patent No.: US 8,685,276 B2
(45) Date of Patent: Apr. 1, 2014

(54) SECURE DOCUMENT COMPRISING LUMINESCENT CHELATES

(75) Inventors: Vickie Aboutanos, Switzerland (CH);
Thomas Tiller, Bussigny (CH);
Christine Reinhard, Prilly (CH);
Stéphanie Rascagnères, Orcier (FR)

(73) Assignee: Sicpa Holding SA, Prilly (CH)

( * ) Notice: Subject to any disclaimer, the term of this patent is extended or adjusted under 35 U.S.C. 154(b) by 82 days.

(21) Appl. No.: 12/777,786

(22) Filed: May 11, 2010

(65) Prior Publication Data

US 2010/0307376 A1   Dec. 9, 2010

(30) Foreign Application Priority Data

May 12, 2009   (WO) .................. PCT/IB2009/005572

(51) Int. Cl.
*C09K 11/06* (2006.01)
*C09D 11/00* (2006.01)

(52) U.S. Cl.
USPC ............ 252/301.26; 252/301.16; 252/301.33; 106/31.15

(58) Field of Classification Search
USPC .......... 106/31.01, 31.13, 31.15, 31.16, 31.25, 106/31.27, 31.28, 31.6, 31.32, 31.64, 106/301.16, 301.26, 301.31, 301.33, 106/301.36; 252/301.16, 301.26, 301.31, 252/301.33, 301.36, 31.01, 31.13, 31.15, 252/31.16, 31.25, 31.27, 31.28, 31.6, 31.32, 252/3, 1.64; 546/2; 534/15, 16
See application file for complete search history.

(56) References Cited

U.S. PATENT DOCUMENTS

| | | | |
|---|---|---|---|
| 5,542,971 A * | 8/1996 | Auslander et al. ......... | 106/31.15 |
| 6,402,986 B1 * | 6/2002 | Jones et al. ............. | 252/301.16 |
| 6,565,770 B1 | 5/2003 | Mayer et al. | |
| 6,905,538 B2 * | 6/2005 | Auslander .................. | 106/31.15 |
| 7,108,742 B2 * | 9/2006 | Hall-Goulle et al. ...... | 106/31.27 |
| 7,381,758 B2 * | 6/2008 | Vuarnoz et al. ............... | 523/160 |
| 2005/0033053 A1 * | 2/2005 | Lee et al. .......................... | 546/2 |
| 2005/0042428 A1 * | 2/2005 | Dean .......................... | 428/195.1 |
| 2007/0134160 A1 * | 6/2007 | Leif et al. ....................... | 424/9.6 |
| 2007/0225402 A1 | 9/2007 | Choi et al. | |
| 2008/0306250 A1 * | 12/2008 | Reardon ......................... | 534/15 |
| 2009/0214972 A1 * | 8/2009 | Wosnick et al. ........... | 430/108.2 |
| 2010/0084852 A1 * | 4/2010 | Hampden-Smith et al. .... | 283/92 |

FOREIGN PATENT DOCUMENTS

| | | |
|---|---|---|
| WO | WO-97/10307 | 3/1997 |
| WO | WO-2008/033059 | 3/2008 |
| WO | WO-2008/065085 | 6/2008 |
| WO | WO-2008/092522 | 8/2008 |
| WO | WO-2009/005733 | 1/2009 |

OTHER PUBLICATIONS

Aebischer et al. 'Intrinsic quantum yields and radiative lifetimes of lanthanide tris(dipicolinates)', Jan. 19, 2009, Physical Chemistry Chemical Physics, vol. 11, pp. 1346-1353.*
International Search Report and Written Opinion for Intl. Pat. Appln. No. PCT/IB2009/005572, dated Jan. 19, 2010 and mailed on Jan. 27, 2010.

* cited by examiner

*Primary Examiner* — Emily Le
*Assistant Examiner* — Lynne Edmondson
(74) *Attorney, Agent, or Firm* — Greenblum & Bernstein, P.L.C.

(57) ABSTRACT

Aqueous thermal inkjet ink composition for the printing of security documents comprising at least one luminescent water-soluble lanthanide complex.

36 Claims, 1 Drawing Sheet

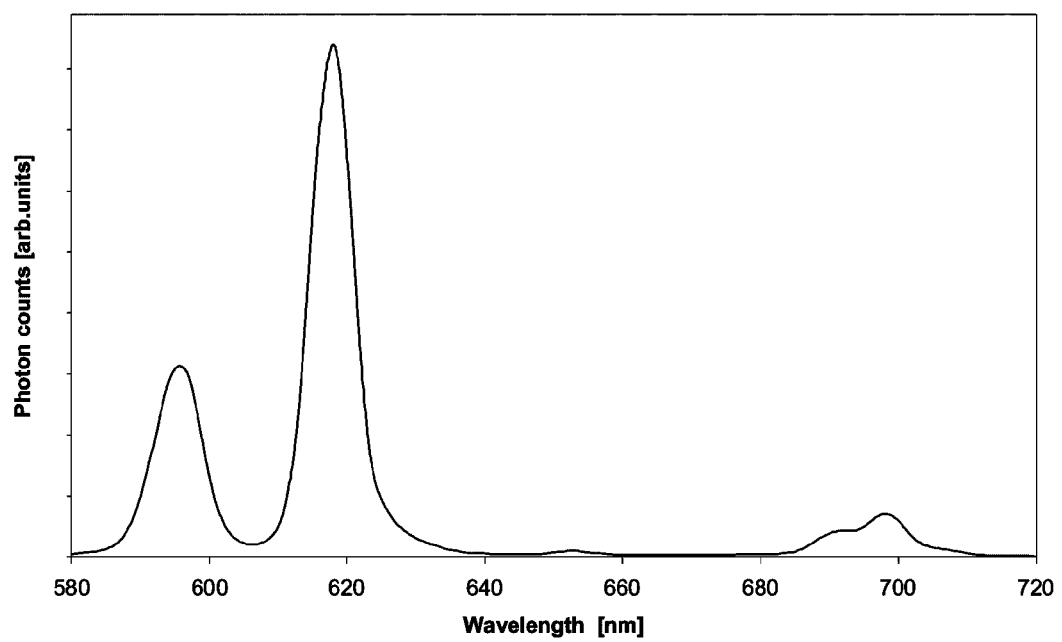

SECURE DOCUMENT COMPRISING LUMINESCENT CHELATES

RELATED APPLICATIONS

This application claims priority to International Application Number PCT/IB2009/005572, filed May 12, 2009. The entire teachings of the above applications are incorporated herein by reference.

FIELD OF THE INVENTION

The invention relates to the field of security documents and aims at improving the security level of such documents.

BACKGROUND OF THE INVENTION

Secure documents such as currency, passports, or identity cards are increasingly counterfeit around the world. This situation is a very critical issue for governments and society in general. For example criminal organizations may use fake passports or identity cards for human beings traffic. As reprographic technologies become more and more sophisticated, it becomes even more difficult to make a clear distinction between a fake document and the original. Document security has therefore a considerable impact on the economy of the countries and also on the victims of illicit traffic involving counterfeit documents.

Passports and identity cards are in general secure documents which contain a large number of protections, such as holograms, bar codes, encrypted data, specific papers or substrates, etc. Some protections are visible to the unaided eye ("overt" features), other protections are invisible ("covert" features) and their detection requires specific equipment.

In the patent application US 2007/0225402 the use of an ultraviolet luminescent ink is disclosed, which is printed in form of indicia onto the document. The ultraviolet luminescent ink is invisible under natural light, such that the indicia can be only revealed under irradiation with U.V. light. This ultraviolet luminescent ink is useful for applying codes onto security documents such as passports or banknotes. In the cited document, printing processes, including silk screen, gravure, letterpress and offset printing are used to apply the invisible ultraviolet fluorescent inks.

Luminescent compounds in pigment form have been widely used in inks and other preparations (see U.S. Pat. No. 6,565,770, WO08033059, WO08092522) Examples of luminescent pigments can be found in certain classes of inorganic compounds, such as the sulphides, oxysulphides, phosphates, vanadates, garnets, spinels, etc. of nonluminescent cations, doped with at least one luminescent cation chosen from the transition-metal or the rare-earth ions.

Another class of compound useful to produce luminescence in ink is formed by certain rare-earth metal complexes such as described in patent applications WO 2009/005733 or in U.S. Pat. No. 7,108,742.

A particular process for imprinting secure document with luminescent compounds, in particular luminescent rare-earth metal complexes, is inkjet printing, and more particularly thermal inkjet printing. Thermal inkjet printers use print cartridges having a series of tiny electrically heated chambers, constructed by photolithography. To produce an image, the printer sends a pulse of electric current through heating elements disposed in the back of each chamber, causing a steam explosion in the chamber, so as to form a bubble, which propels a droplet of ink through an orifice of the chamber onto the paper in front of it (hence the tradename Bubblejet® for certain inkjet printers). The ink's surface tension, as well as the condensation and thus contraction of the vapor bubble, pulls a further charge of ink into the chamber through a narrow channel attached to an ink reservoir.

The ink used is aqueous (i.e. a water-based ink comprising pigments or dyes), and the print head is generally cheaper to produce than the equipment required for other inkjet technologies. However, its lifetime is short, and it is generally exchanged together with the empty ink cartridge.

A major problem encountered with inkjet printers is ink drying in the printhead's nozzles, causing the pigments and/or dyes to form a solid deposit that plugs the microscopic ink orifices. Most printers prevent this drying by automatically covering the printhead nozzles with a rubber cap when the printer is not in use. Abrupt power loss, or unplugging the printer before it has capped its printhead, can, however, cause the printhead to dry out. Further, even when capped—this seal being not perfect—, over a period of several weeks, the ink in the nozzles can dry out and plug them. Once ink begins to dry out in the nozzles, the drop volume is affected, the drop trajectory can change, or the nozzle can completely fail to jet any ink.

In the case of luminescent inkjet inks comprising rare earth metal complexes, the stability of the complex in water is critical to avoid nozzle obstruction. In order to prevent premature drying, adding water or solvent, to sufficiently dilute the ink, is an obvious solution. However, dilution with water or solvent reduces the intensity of luminescence (and thus the ease of detection) of the security document printed with such ink.

Another problem encountered in thermal ink-jet printing is "Kogation". Kogation (from Japanese "koge"=scorch, burn, char) is the thermal decomposition of ink components on the surface of the heating elements disposed in the back of each chamber of the ink-jet printing head, producing solid decomposition products, which may then obstruct the nozzle of the chamber.

Although rare earth metal complexes would represent a very useful way of imparting luminescence to inkjet inks, the problem of ink drying in the nozzles makes it often impossible to use the inkjet cartridges in their entirety, and causes thus increased ink cartridge consumption cost. This has not only an ecological and security impact, due to the "recycling" problem caused by such "used" cartridge, but also a non-negligible impact on the cost of printing.

Thus there is still a crucial need to solve the above mentioned problems in order to promote the efficient use of luminescent ink-jet inks based on rare earth metal complexes, and therefore to obtain correctly printed and protected security documents during the whole life of the ink cartridge.

SUMMARY OF THE INVENTION

The present invention overcomes the above described disadvantages by:

i. providing a stable level of luminescence for the efficient marking security documents during the whole life of the ink cartridge, ii. providing a luminescent ink which contains a stable rare earth metal complex, iii. avoiding the nozzle obstruction responsible for the impossibility to use the ink cartridge in its entirety.

The foregoing is accomplished by using a specific aqueous inkjet composition comprising at least one specific class of rare earth metal complexes in a specific ratio.

The rare-earth metal complexes of the present invention are chosen from the luminescent lanthanide complexes of trivalent rare-earth ions with three dinegatively charged, tridentate 5- or 6-membered heteroaryl ligands.

The luminescent ink used comprises a stable, water-soluble tris-complex of a trivalent rare-earth cation with an atomic number between 58 and 70, such as: Pr, Nd, Sm, Eu, Gd, Tb, Dy, Ho, Er, Tm, Yb and the mixtures thereof, with a tridentate, dinegatively charged heteroaryl ligand that absorb in the ultraviolet and/or the blue region of the electromagnetic spectrum. The luminescent emission in these lanthanide complexes is due to inner f-shell transitions such as: $^5D_0 \rightarrow ^7F_1$ and $^5D_0 \rightarrow ^7F_2$ for Eu (3+).

According to the present invention, a neat stoichiometric complex of the trivalent rare-earth ion is used, rather than a solution of a rare-earth ion salt in a large excess of the ligand.

This is possible with ligands which form very stable anionic complexes with the trivalent rare-earth ion, such that no dissociation (hydrolysis or pyrolysis) occurs in aqueous solution upon heating. Hydrolysis would noteworthy lead to precipitates and corresponding nozzle obstruction.

An example of such a ligand is the dianion of dipicolinic acid, dpa2-, which forms a stable, highly water-soluble 1:3 complex with trivalent rare-earth ions such as Eu(3+), according to the formula:

$Eu^{3+} \rightarrow [Eu(dpa)]^+ \rightarrow [Eu(dpa)_2]^- \rightarrow [Eu(dpa)_3]^{3-}$ which does not hydrolyze in aqueous solution.

Thus, according to the present invention, a neat complex salt of the following formula is used as the luminescent ink component:

$M_3[Ln(A)_3]$ wherein M is chosen from the alkali cations Li$^+$, Na$^+$, K$^+$, Rb$^+$ and Cs$^+$ and the mixtures thereof;

wherein Ln is chosen from the trivalent rare-earth cations of Ce, Pr, Nd, Sm, Eu, Gd, Tb, Dy, Ho, Er, Tm, and Yb and the mixtures thereof;

and wherein A is a dinegatively charged, tridentate 5- or 6-membered heteroaryl ligand, such as the dipicolinate anion.

The use of such neat complex salt avoids any unnecessary excess of free ligand in the ink, reducing thus its overall solid content, and therewith its tendency to obstruct (to clog) the inkjet nozzles through kogation or drying.

These and other features and advantages of the present invention will be more readily understood from a reading of the following detailed description by those of ordinary skill in the art. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombinaton. Further, reference to values stated in ranges include each and every value within that range.

DETAILED DESCRIPTION OF THE INVENTION

According to the present invention the aqueous inkjet ink composition comprises at least one luminescent lanthanide complex of the formula:

$M_3[Ln(A)_3]$ wherein M is chosen from the alkali cations Li$^+$, Na$^+$, K$^+$, Rb$^+$ and Cs$^+$ and the mixtures thereof;

wherein Ln is chosen from the trivalent rare-earth cations of Ce, Pr, Nd, Sm, Eu, Gd, Tb, Dy, Ho, Er, Tm, and Yb;

and wherein A is a dinegatively charged, tridentate 5- or 6-membered heteroaryl ligand, such as the dipicolinate anion, in which the complex has an exact 1:3 (Ln:A) stoichiometry.

The process to obtain the complex $M_3[Ln(A)_3]$ of the present invention comprises the step of reacting a precursor compound of a trivalent lanthanide ion Ln with 3 equivalents of the dinegatively charged, tridentate 5- or 6-membered heteroaryl ligand A in the presence of at least 3 equivalents of the alkali cation M.

As a precursor compound of a trivalent lanthanide ion Ln, an oxide $Ln_2O_3$, a chloride, $LnCl_3$, a carbonate, $Ln_2(CO_3)_3$ or an acetate, $Ln(CH_3COO)_3$ may be used.

The dinegatively charged, tridentate 5- or 6-membered heteroaryl ligand A may be employed as the free acid $H_2A$, together with the required amount of base, as the monoalkali-salt HMA, or as the dialkali salt $M_2A$.

The components of the complex salt are combined in aqueous solution, e.g.

$EuCl_3 + 3Na_2(dpa) \rightarrow Na_3[Eu(dpa)_3] + 3NaCl$ and the resulting complex salt is preferably recrystallized, so as to separate it from byproducts of the reaction, such as NaCl, which are not desirable to achieve the goal of the invention, i.e. an ink with the lowest possible solid contents.

The advantage of the recrystallization process is to provide a lanthanide complex salt with a minimal by-product content. This has an impact on the solubility of the complex and an on the drying or kogation phenomena. In a preferred embodiment the concentration of Cl$^-$ present with the complex salt, is below 0.1% Cl$^-$ of the total weight of the complex salt or 0.17% NaCl, respectively. To obtain high quality of print, the final chloride content of the complex salt should not exceed 0.1% wt. In case of an acceptable print quality, the chloride content of the complex salt is comprised between 0.1% wt and 0.25% wt.

In a preferred embodiment the dinegatively charged, tridentate 5- or 6-membered heteroaryl ligand A is selected from the group consisting of pyridine, imidazole, triazole, pyrazole, pyrazine bearing at least one carboxylic acid group. The 5 to 6 membered heteroaryl of the present invention bearing at least one carboxylic group can be further substituted by a group hydroxyl, amino, a $C_1$-$C_6$-alkoxy, such as a methoxy, ethoxy, isopropoxy, etc. group or a $C_1$-$C_6$-alkyl, such as a methyl, ethyl, isopropyl, etc. group.

Specific dinegatively charged, tridentate 5- or 6-membered heteroaryl ligands A used in the complex salts of the invention are selected from the group consisting of dipicolinic acid, 4-hydroxypyridine-2,6-dicarboxylic acid, 4-amino-pyridine-2,6-dicarboxylic acid, 4-ethoxypyridine-2,6-dicarboxylic acid, 4-isopropoxypyridine-2,6-dicarboxylic acid and/or 4-methoxypyridine-2,6-dicarboxylic acid.

In a more preferred embodiment the dinegatively charged, tridentate 5- or 6-membered heteroaryl ligand A present in the ink according to the present invention is selected from the group consisting of dipicolinic acid and/or 4-hydroxypyridine-2,6-dicarboxylic acid and the trivalent lanthanide ion is of Europium (Eu3+) and/or Terbium (Tb3+). In most preferred embodiment, dipolinic acid or 4-hydroxypyridine-2,6-dicarboxylic acid are used in combination with europium (Eu3+).

The percentage of the lanthanides complex salt in the aqueous inkjet ink of the present invention is between 1 to 15 wt % based on the total weight of the composition, more preferably 1 to 8 wt % and even mere preferably 1 to 3 wt %.

All the above lanthanide complexes show a strong absorption in the ultraviolet region of the electromagnetic spectrum.

According to FIG. 1, an aqueous ink of the present invention, based on $[Eu(dpa)_3]^{3-}$ shows a strong red emission with a maximum at 617 nm when exposed to 254 nm UV light.

The aqueous ink according to the present invention is suitable for thermal ink-jet printing which is an efficient inkjet printing technique for the coding and marking of products, packages or documents of value.

In order to prevent the premature drying of the aqueous ink composition according to the present invention during the printing process, the aqueous inkjet ink of the invention further comprises at least one hygroscopic substance. The hygroscopic substance is selected each independently from the group consisting of primary, secondary or tertiary alcohol, lactams, polymeric glycols, glycol, cyclic sulfones.

In a more preferred embodiment the hygroscopic substance is selected each independently from the group consisting of DL-hexane-1,2-diol, 2-pyrrolidone, sulfolane, tetramethylene sulfoxide, gamma-butyrolactone, 1,3-dimethyl-2-imidazolidinone, 2-propanediol, pentanediol, 1,2 hexanediol, trimethylolpropane, glycerol, ethyleneglycol, diethyleneglycol, polypropyleneglycol, polyethyleneglycol, ethanol, propanol, butanol.

The percentage of the hygroscopic substance in the aqueous ink of the invention is between 5 to 45% based on the total weight of the composition, more preferably 10 to 45% and even more preferably 20 to 45%.

The aqueous ink composition according to the invention can also further include at least one visible dyestuff or pigment which would give color to the present ink when admixed to it. In a preferred embodiment the visible dyestuff or pigment is selected from the group consisting of monoazo and/or disazo dyes, monoazo Cu-complexes dyes. Example of such dyestuff can be those produced by CIBA company under the name of IRGASPERSE Jet®. The aqueous ink composition according to the invention further contains 1 to 15 wt %. of a visible dyestuff or pigment, based on the total weight. of the composition.

Depending on the nature of the security documents to be imprinted, the printing ink according to the present invention can furthermore comprise customary additives, such as, for example, fungicides, biocides surfactants, sequestering agents, pH adjusters, co solvents or binders, such as, for example, acrylate binders, in the amounts customary for these additives.

Another object of the present invention is the use of the aqueous ink according the present invention for authenticating an article, such as a banknote, a passport, a security document, a value document, a ticket, a foil, a thread, a label, a card, or a commercial good.

It is also another object of the present invention to provide a security document comprising at least one layer made with an ink according to the invention.

The invention is further illustrated by the following non-limiting examples. Percentages are by weight. Those skilled in the art will recognize that many variations are possible within the spirit and scope of these examples, which are intended to be defined by the following claims and their equivalents in which all terms are meant in their broadest reasonable sense unless otherwise indicated.

FIG. 1 shows the luminescence spectrum of an inkjet print of a $Na_3[Eu(dpa)_3]$ containing ink, excited at 254 nm. Strong red emission with a maximum at 617 nm can be observed under 254 nm excitation.

EXAMPLES 1.1 Synthesis of $Na_3[Eu(dpa)_3]*nH_2O$ 315 g of 2,6-pyridinedicarboxylic acid were dissolved in 5.4 l of distilled water at 90° C. A solution of 230 g $EuCl_3*6H_2O$ in 250 ml of water was added under continuous stirring. Then the mixture was allowed to cool down to room temperature and neutralized with a 2M solution of NaOH until the pH reached a value in-between 7.5-8.5.

Once the pH was stable, the solution was evaporated to dryness. The resulting powder was re-dissolved in hot water at a solid/liquid ratio of 1/2.25. To crystallize the product, the solution was slowly cooled down to room temperature. The crystallized product was filtered and then dried.

1.2 Synthesis of $Na3[Tb(dpa)3]*nH_2O$ 315 g of 2,6-pyridinedicarboxylic acid were dissolved in 5.4 l of distilled water at 90° C. Then a solution of 235 g $TbCl_3*6H_2O$ in 250 ml of water was added. The cooled down solution was neutralized with 2M NaOH until the pH reached a value of 7.5-8.5. Once the pH was stable, the solution was filtered and concentrated up to a final reaction volume of 1.5 l. Then the precipitate was re-dissolved at 90° C. and the product was allowed to crystallize over-night. The product was then isolated by passing through a centrifugal drier. To increase the purity of the final product, the powder can be re-dispersed in a mixture of water and ice. The washed powder can finally be filtered and dried.

1.3 Example of Formulation of an Ink Containing a Complex According to the Invention:

Black with Fluorescent Red (254 nm):

To a solution of deionized water (204 g) are added 2-pyrrolidone (30 g) and 1,2-hexanediol (15 g). The solution is stirred at 500-600 rpm in order to obtain a homogenized solution. 15 g of $Na_3[Eu(dpa)_3]$ are added to the solution, then heated at 40° C. until the complex is totally solubilized. The solution is cooled to ambient temperature, and then 18 g of Irgasperse® Jet Cyan RL, 13.65 g Irgasperse® Jet yellow RL and 4.35 g Irgasperse® Jet Magenta B are added, the mixture is stirred at 500-600 rpm around 20 minutes. After stirring, the solution is filtered to remove all insoluble compounds and unreacted products.

The black ink obtained is packaged in a HP45 cartridge and used with a Deskjet printer of the 960Cxi, 970Cxi, 980Cxi or 990Cxi series. Fluorescence at 254 nm is checked using a fisher Bioblock Scientific VL-4.LC lamp is well visible. In order to assess ink stability, two tests were performed:

Printing of 200 pages in a row followed by 2 to 4 days interruption and restart for another 400 pages.

Short print tests are made after 1 week, 2 weeks, 3 weeks, 4 weeks and then every 4 weeks over a 6 month period.

No problems of printing and drying occurred with the ink according to the present invention during the stability tests. In all cases fluorescence intensity remained unchanged at very satisfactory level.

The invention claimed is:

1. Aqueous inkjet ink composition comprising at least one recrystallized luminescent lanthanide complex of the formula:

wherein

M is chosen from the alkali cations $Li^+$, $Na^+$, $K^+$, $Rb^+$ and $Cs^+$ and mixtures thereof;

Ln is chosen from the trivalent rare-earth cations of Ce, Pr, Nd, Sm, Eu, Gd, Tb, Dy, Ho, Er, Tm, and Yb and mixtures thereof; and wherein A is a dinegatively charged, tridentate 5- or 6-membered heteroaryl ligand selected from the group consisting of pyridine, imidazole, triazole, pyrazole, and pyrazine, bearing at least one carboxylic group, and wherein no excessive ligand A in free form is present in the aqueous inkjet composition.

2. The aqueous ink composition according claim 1 wherein if Cl— is present in the complex, an amount of Cl— of the complex does not exceed 0.1 wt % based on the total weight of the complex.

3. The aqueous ink composition according to claim 1 wherein if Cl— is present in the complex, an amount of Cl— of the complex is between 0.1 wt % and 0.25 wt % based on the total weight of the complex.

4. The aqueous ink composition according to claim 1 further including at least one hygroscopic substance.

5. The aqueous ink composition according to claim 1 further including at least one visible dyestuff or pigment.

6. The aqueous ink composition according to claim 1 which contains 1-15 wt % of the at least one luminescent lanthanide complex, based on the total weight of the composition.

7. The aqueous ink composition according to claim 4 which contains 5 to 45 wt % of the at least one hygroscopic substance, based on the total weight of the composition.

8. The aqueous ink composition according to claim 5 which contains 1 to 15 wt % of the at least one visible dyestuff or pigment, based on the total weight of the composition.

9. The aqueous ink composition according to claim 4 wherein the at least one hygroscopic substance is selected from the group consisting of primary, secondary or tertiary alcohol, lactams, polymeric glycol, glycol, and cyclic sulfone.

10. The aqueous ink composition according to claim 4 wherein the at least one hygroscopic substance is selected from the group consisting of DL-hexane-1,2-diol, 2-pyrrolidone, sulfolane, tetramethylene sulfoxide, gamma-butyrolactone, 1,3-dimethyl-2-imidazolidinone, 2-propanediol, pentanediol, 1,2 hexanediol, trimethylolpropane, glycerol, ethyleneglycol, diethyleneglycol, polypropyleneglycol, polyethyleneglycol, ethanol, propanol, and butanol.

11. The aqueous ink composition according to claim 5 wherein the at least one visible dyestuff or pigment is selected from the group consisting of monoazo dyes, diazo dyes, and monoazo Cu-complex dyes.

12. The aqueous ink composition according to claim 1, wherein A is dipicolinic acid and/or 4-hydroxypyridine-2,6-dicarboxylic acid and wherein Ln is chosen from the trivalent ions of Europium (Eu3+) and/or Terbium (Tb3+).

13. An article comprising the aqueous ink composition according to claim 1.

14. A security document comprising at least one layer made with the aqueous ink composition according to claim 1.

15. Process to obtain the complex $M_3[Ln(A)_3]$ according to claim 1, comprising reacting one equivalent of a precursor compound of a trivalent lanthanide ion Ln with 3 equivalents of the dinegatively charged, tridentate 5- or 6-membered heteroaryl ligand A in the presence of at least 3 equivalents of the alkali cation M in aqueous solution; and recrystallizing a resulting complex to separate the resulting complex from byproducts.

16. The process according to claim 15, wherein the precursor compound of the trivalent lanthanide ion Ln is selected from the group consisting of oxides $Ln_2O_3$, chlorides $LnCl_3$, carbonates $Ln_2(CO_3)_3$ and acetates $Ln(CH_3COO)_3$.

17. The process according to claim 15, wherein the dinegatively charged tridentate 5- or 6-membered heteroaryl ligand A is employed as a free acid $H_2A$ together with a required amount of base, or as a monoalkali-salt HMA, or as a dialkali salt $M_2A$.

18. The aqueous inkjet ink composition according to claim 1, wherein the tridentate 5- or 6-membered heteroaryl ligand is substituted with at least one of a hydroxyl group, amino group, $C_1$-$C_6$-alkoxy group, and $C_1$-$C_6$-alkyl group.

19. The aqueous inkjet ink composition according to claim 18, wherein the $C_1$-$C_6$-alkoxy group is methoxy, ethoxy or isopropoxy.

20. The aqueous inkjet ink composition according to claim 18, wherein the $C_1$-$C_6$-alkyl group is methyl, ethyl or isopropyl.

21. The aqueous inkjet ink composition according to claim 1, wherein the dinegatively charged tridentate 5- or 6-membered heteroaryl ligand A is dipicolinic acid, 4-amino-pyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid.

22. The article according to claim 13, wherein the article is a banknote, passport, a security document, a value document, a ticket, a foil, a thread, a label, a card, or a commercial good.

23. Aqueous inkjet ink composition comprising at least one luminescent lanthanide complex of the formula:

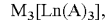

$M_3[Ln(A)_3]$, wherein

M is chosen from the alkali cations Li+, Na+, K+, Rb+ and Cs+ and mixtures thereof;

Ln is chosen from the trivalent rare-earth cations of Ce, Pr, Nd, Sm, Eu, Gd, Tb, Dy, Ho, Er, Tm, and Yb and mixtures thereof;

A is a dinegatively charged, tridentate 5- or 6-membered heteroaryl ligand selected from the group consisting of pyridine, imidazole, triazole, pyrazole, and pyrazine, bearing at least one carboxylic group, and wherein no excessive ligand A in free form is present in the aqueous inkjet ink composition; and the luminescent lanthanide complex has an amount of Cl⁻ between 0.1 wt % and 0.25 wt % based on the total weight of the complex.

24. The aqueous inkjet ink composition according to claim 23, wherein the tridentate 5- or 6-membered heteroaryl ligand is substituted with at least one of a hydroxyl group, amino group, $C_1$-$C_6$-alkoxy group, and $C_1$-$C_6$-alkyl group.

25. The aqueous inkjet ink composition according to claim 23, wherein the dinegatively charged tridentate 5- or 6-membered heteroaryl ligand A is dipicolinic acid, 4-amino-pyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid.

26. Aqueous inkjet ink composition comprising at least one luminescent lanthanide complex of the formula:

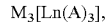

$M_3[Ln(A)_3]$, wherein

M is chosen from the alkali cations Li+, Na+, K+, Rb+ and Cs+ and mixtures thereof;

Ln is chosen from the trivalent rare-earth cations of Ce, Pr, Nd, Sm, Eu, Gd, Tb, Dy, Ho, Er, Tm, and Yb and mixtures thereof;

A is a dinegatively charged, tridentate 5- or 6-membered heteroaryl ligand selected from the group consisting of pyridine, imidazole, triazole, pyrazole, and pyrazine, bearing at least one carboxylic group, and wherein no excessive ligand A in free form is present in the aqueous inkjet ink composition; and the luminescent lanthanide complex has an amount of Cl⁻ below 0.1 wt % based on the total weight of the complex.

27. The aqueous inkjet ink composition according to claim 26, wherein the tridentate 5- or 6-membered heteroaryl ligand is substituted with at least one of a hydroxyl group, amino group, $C_1$-$C_6$-alkoxy group, and $C_1$-$C_6$-alkyl group.

28. The aqueous inkjet ink composition according to claim 26, wherein the dinegatively charged tridentate 5- or 6-membered heteroaryl ligand A is dipicolinic acid, 4-amino-pyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid.

29. An article comprising the aqueous ink composition according to claim 23.

30. The article according to claim 29, wherein the article comprises a security document.

31. An article comprising the aqueous ink composition according to claim 26.

32. The article according to claim 31, wherein the article comprises a security document.

33. The article according to claim 13, wherein the article comprises a security document.

34. A process of marking an article comprising applying the aqueous ink composition according to claim 1 on the article.

35. A process of marking an article comprising applying the aqueous ink composition according to claim 23 on the article.

36. A process of marking an article comprising applying the aqueous ink composition according to claim 26 on the article.

* * * * *

UNITED STATES PATENT AND TRADEMARK OFFICE
CERTIFICATE OF CORRECTION

PATENT NO. : 8,685,276 B2
APPLICATION NO. : 12/777786
DATED : April 1, 2014
INVENTOR(S) : Aboutanos et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this
Twenty-third Day of August, 2016

Michelle K. Lee
*Director of the United States Patent and Trademark Office*